ANDREW J. COX.

Improvement in Churns.

No. 124,883.  Patented March 26, 1872.

WITNESSES;

INVENTOR.

124,883

UNITED STATES PATENT OFFICE.

ANDREW J. COX, OF INDIANAPOLIS, INDIANA.

IMPROVEMENT IN CHURNS.

Specification forming part of Letters Patent No. 124,883, dated March 26, 1872.

Specification describing certain Improvements in Churns, invented by ANDREW J. COX, of Marion county and State of Indiana.

My invention consists in a new arrangement of paddles and packing within a suitable box for the purpose of making butter from cream or milk.

Figure 1:
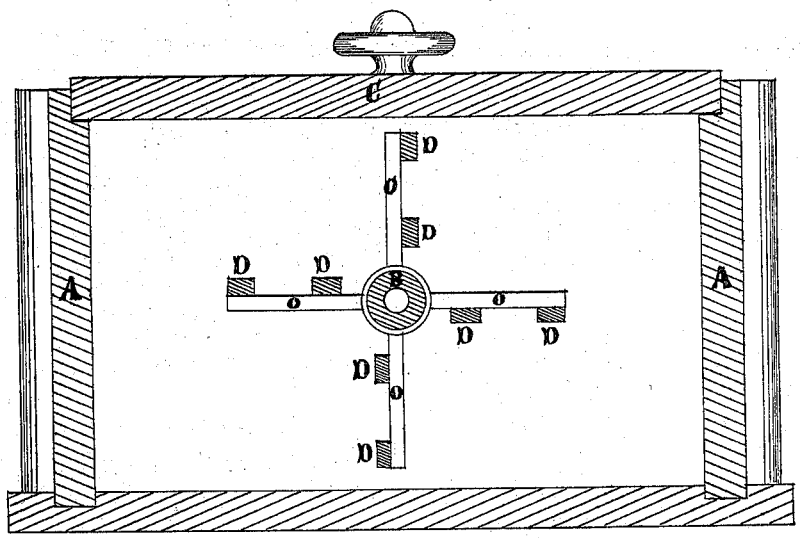
Figure 2:
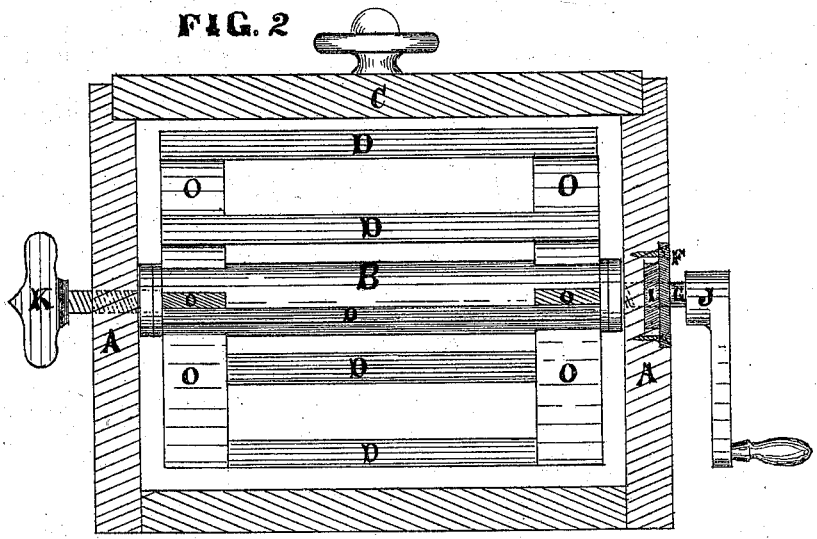

Figure 1 represents a side elevation of the churn embodying my improvement. Fig. 2 represents an end elevation of the same.

A A represent the box; B, the shaft, upon which the dashers or bars are made fast; C, the cover of the churn; D D, the dash-bars, made fast to the shaft B by the arms or spokes O. O O O O are the spokes mortised into the shaft B. J is the crank, which operates the shaft B and dashers D D. G is a small shaft, made fast in the crank J at one end, and the other end screws into the paddle-shaft B, so that it can be removed by unscrewing and the paddle-shaft B taken out of the churn at pleasure. K is a thumb-screw, with the end that engages the paddle-shaft B pointed so as to form a pivot for the shaft to revolve on. E is a rubber packing that the shaft G passes through and prevents the churn from leaking at that place. F is a plate of iron screwed on the outside of the rubber packing E to hold it in its place.

The operation of my improvement is as follows: The paddle-shaft B D O is placed in the box, and the crank J is screwed into the shaft B after passing through the rubber packing, and the thumb-screw pivot K is adjusted. The milk or cream is then placed in the box A A and the cover C is placed on the churn. The paddles are then revolved by means of the crank J.

Claim.

In combination with the horizontal rotary dasher B O O D D, constructed as shown and described, the removable screw-pivot G, rubber washer E, metallic plate F, and thumb-screw K, arranged as specified.

In testimony whereof I have signed my name to this specification in the presence of two subscribing witnesses.

ANDREW J. COX.

Witnesses:
S. C. FRINK,
E. S. FRINK.